United States Patent
Choi et al.

(10) Patent No.: US 8,958,034 B2
(45) Date of Patent: Feb. 17, 2015

(54) POLARIZING PLATE COMPRISING A COMPENSATION FILM HAVING A FIRST RETARDATION VALUE $R_o$ AND A SECOND RETARDATION VALUE $R_{th}$ AND LIQUID CRYSTAL DISPLAY HAVING THE SAME

(71) Applicant: Samsung Display Co., Ltd., Yongin, Gyeonggi-Do (KR)

(72) Inventors: Min Oh Choi, Cheonan-si (KR); Hee Wook Do, Cheonan-si (KR); Kyeongha Kim, Yongin-si (KR); Duckjong Suh, Seoul (KR); Tecksoo Kim, Seongnam-si (KR); Seungbeom Park, Hwaseong-si (KR); Sang-Gu Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 167 days.

(21) Appl. No.: 13/857,347

(22) Filed: Apr. 5, 2013

(65) Prior Publication Data

US 2014/0125924 A1    May 8, 2014

(30) Foreign Application Priority Data

Nov. 8, 2012  (KR) .................. 10-2012-0126008

(51) Int. Cl.
  *G02F 1/1335*   (2006.01)
(52) U.S. Cl.
  CPC ................. *G02F 1/133528* (2013.01)

USPC ............................................ 349/118; 349/96
(58) Field of Classification Search
  USPC .................................................. 349/117–121
  See application file for complete search history.

(56) References Cited

U.S. PATENT DOCUMENTS 5,472,538 A    12/1995  Minakuchi et al.
7,588,807 B2    9/2009  Hayashi et al.
(Continued)

FOREIGN PATENT DOCUMENTS

JP   2000147259 A   5/2000
JP   2002196134 A   7/2002
(Continued)

*Primary Examiner* — Paul Lee
(74) *Attorney, Agent, or Firm* — Cantor Colburn LLP

(57) ABSTRACT

A liquid crystal display includes a liquid crystal panel, a polarizing plate on a surface of the liquid crystal panel and having a polarizing axis; and a compensation film between the liquid crystal panel and the polarizing plate, and having an optical axis at which light passes through the compensation film. When a surface of the compensation film is referred to as a x-y plane, a plane passing through an x-axis and vertical to the optical axis of the compensation film is referred to as an x-y' plane. A first retardation value ($R_o'$) of the compensation film is $(n_x - n_y')d$, and a second retardation value ($R_{th}'$) is $[(n_x + n_y')/2 - n_z']d$, and the first and second retardation values ($R_o'$) and ($R_{th}'$) satisfy the following Formula of $0.92 \le R_{th}'/R_o' \le 4.75$, where 'n' denotes a refractive index and 'd' denotes a thickness of the compensation film in a z-axis direction.

19 Claims, 9 Drawing Sheets

(56) References Cited

U.S. PATENT DOCUMENTS

| | | |
|---|---|---|
| 2010/0104776 A1* | 4/2010 | Kim et al. .................... 428/1.31 |
| 2010/0128206 A1* | 5/2010 | Kim et al. ....................... 349/96 |
| 2010/0157208 A1* | 6/2010 | Hanne ............................. 349/96 |
| 2010/0188625 A1* | 7/2010 | Jeon et al. ..................... 349/117 |
| 2010/0188627 A1* | 7/2010 | Jeon et al. ..................... 349/119 |
| 2010/0208176 A1* | 8/2010 | Ge et al. ......................... 349/98 |
| 2011/0063544 A1 | 3/2011 | Hashimoto |
| 2011/0255038 A1* | 10/2011 | Chang et al. .................... 349/96 |
| 2012/0069287 A1* | 3/2012 | Lyu et al. ...................... 349/155 |

FOREIGN PATENT DOCUMENTS

| | | |
|---|---|---|
| JP | 2003025414 A | 1/2003 |
| JP | 2003139955 A | 5/2003 |
| JP | 2006194997 A | 7/2006 |
| JP | 2006285136 A | 10/2006 |
| JP | 2007316603 A | 12/2007 |
| JP | 2009192845 A | 8/2009 |
| JP | 2011145704 A | 7/2011 |

\* cited by examiner

POLARIZING PLATE COMPRISING A COMPENSATION FILM HAVING A FIRST RETARDATION VALUE $R_o$ AND A SECOND RETARDATION VALUE $R_{th}$ AND LIQUID CRYSTAL DISPLAY HAVING THE SAME

This U.S. application claims priority to Korean Patent Application No. 10-2012-0126008, filed on Nov. 8, 2012, and all the benefits accruing therefrom under 35 U.S.C. §119, the contents of which are hereby incorporated by reference in their entirety.

BACKGROUND

1. Field

The invention relates to a polarizing plate and a liquid crystal display.

2. Description of the Related Art

In general, a liquid crystal display includes a liquid crystal panel, and a pair of polarizing plates respectively disposed at upper and lower sides of the liquid crystal panel. The liquid crystal panel includes an array substrate including a plurality of pixels arranged in a matrix form, an opposite substrate facing the array substrate, and a liquid crystal layer disposed between the array substrate and the opposite substrate and including liquid crystals. The liquid crystal panel is applicable to various liquid crystal modes in accordance with arrangement of the liquid crystals and a liquid crystal phase. As a representative example, the liquid crystal panel is classified into a liquid crystal panel adopting a nematic liquid crystal phase and a liquid crystal panel adopting a smectic liquid crystal phase.

A twisted-nematic liquid crystal display, as a representative liquid crystal display adopting the nematic liquid crystal phase, has superior light transmittance, but a narrow viewing angle as compared to the other liquid crystal displays.

To compensate for the viewing angle, the twisted-nematic liquid crystal display employs a discotic liquid crystal ("DLC") compensating film. The DLC compensating film is generally manufactured by coating discotic liquid crystals on a tri-acetyl-cellulose film. However, the DLC compensating film manufactured by coating the discotic liquid crystals on the tri-acetyl-cellulose film has an undesirably high cost, and a manufacturing process thereof is complicated. Therefore, there remains a need for an optical compensating film with a reduced cost and simpler manufacturing process.

SUMMARY

One or more exemplary embodiment of the invention provides a polarizing plate having a compensation film.

One or more exemplary embodiment of the invention provides a liquid crystal display having the compensation film to improve a contrast ratio.

An exemplary embodiment of the invention provides a liquid crystal display including a liquid crystal panel, a polarizing plate disposed on a surface of the liquid crystal panel and having a polarizing axis, and a compensation film disposed between the liquid crystal panel and the polarizing plate and having an optical axis at which light passes through the compensation film. When a surface of the compensation film is referred to as a x-y plane, a plane passing through an x-axis and vertical to the optical axis of the compensation film is referred to as an x-y' plane, a first retardation value ($R_o'$) of the compensation film is $(n_x-n_y')d$ and a second retardation value ($R_{th}'$) is $[(n_x+n_y')/2-n_z']d$, and the first and second retardation values ($R_o'$) and ($R_{th}'$) satisfy the following Formula of $0.92 \leq R_{th}'/R_o' \leq 4.75$, where 'n' denotes a refractive index and 'd' denotes a thickness of the compensation film taken along a z-axis.

When the optical axis of the compensation film is a z'-axis which is vertical to the x-y' plane, the first retardation value may be a retardation value with respect to the x-y' plane and the second retardation value may be a retardation value with respect to the z'-axis of the compensation film. The first retardation value may be in a range from about 40 nanometers (nm) to about 100 nm and the second retardation value may be in a range from about 110 nm to about 200 nm.

An angle between the optical axis and the z-axis of the compensation film may be in a range from about 10° to about 25°.

The polarizing plate may include a first polarizing film disposed on a first surface of the liquid crystal panel and having a first polarizing axis, and a second polarizing film disposed on a second surface of the liquid crystal panel opposite to the first surface and having a second polarizing axis. The first polarizing axis and the second polarizing axis may cross each other.

The liquid crystal display may include a plurality of compensation films including a first compensation film disposed between the liquid crystal panel and the first polarizing film, and a second compensation film disposed between the liquid crystal panel and the second polarizing film. The x-y' plane of the first compensation film may be inclined at the angle with respect to a line substantially parallel to the first polarizing axis of the first polarizing film and the x-y' plane of the second compensation film may be inclined at the angle with respect to a line substantially parallel to the second polarizing axis of the second polarizing film.

The liquid crystal panel may include a first substrate, a second substrate facing the first substrate, and a liquid crystal disposed between the first substrate and the second substrate. The liquid crystal may be a twisted nematic liquid crystal.

The twisted nematic liquid crystal may have a dielectric anisotropy in a range from about 7 to about 13, and the twisted nematic liquid crystal may have a retardation value in a range from about 400 nm to about 480 nm.

The liquid crystal display may further include a first alignment layer disposed between the first substrate and the liquid crystal and aligned in a same direction as the first polarizing axis of the first polarizing film, and a second alignment layer disposed between the second substrate and the liquid crystal and aligned in a same direction as the second polarizing axis of the second polarizing film.

According to one or more exemplary embodiment of the invention, a liquid crystal display includes a compensation films instead of a discotic liquid crystal ("DLC") compensation film. Thus, the liquid crystal display may have an improved viewing angle and improved contrast ratio, and a reduced manufacturing cost.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
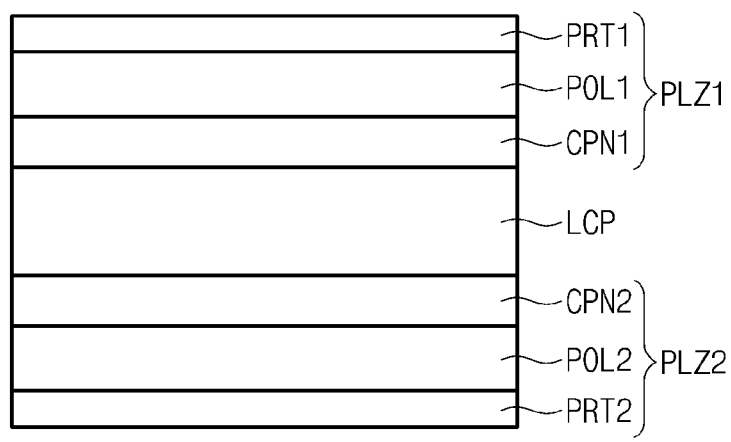
FIG. 1 is a cross-sectional view showing an exemplary embodiment of a liquid crystal display according to the invention.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
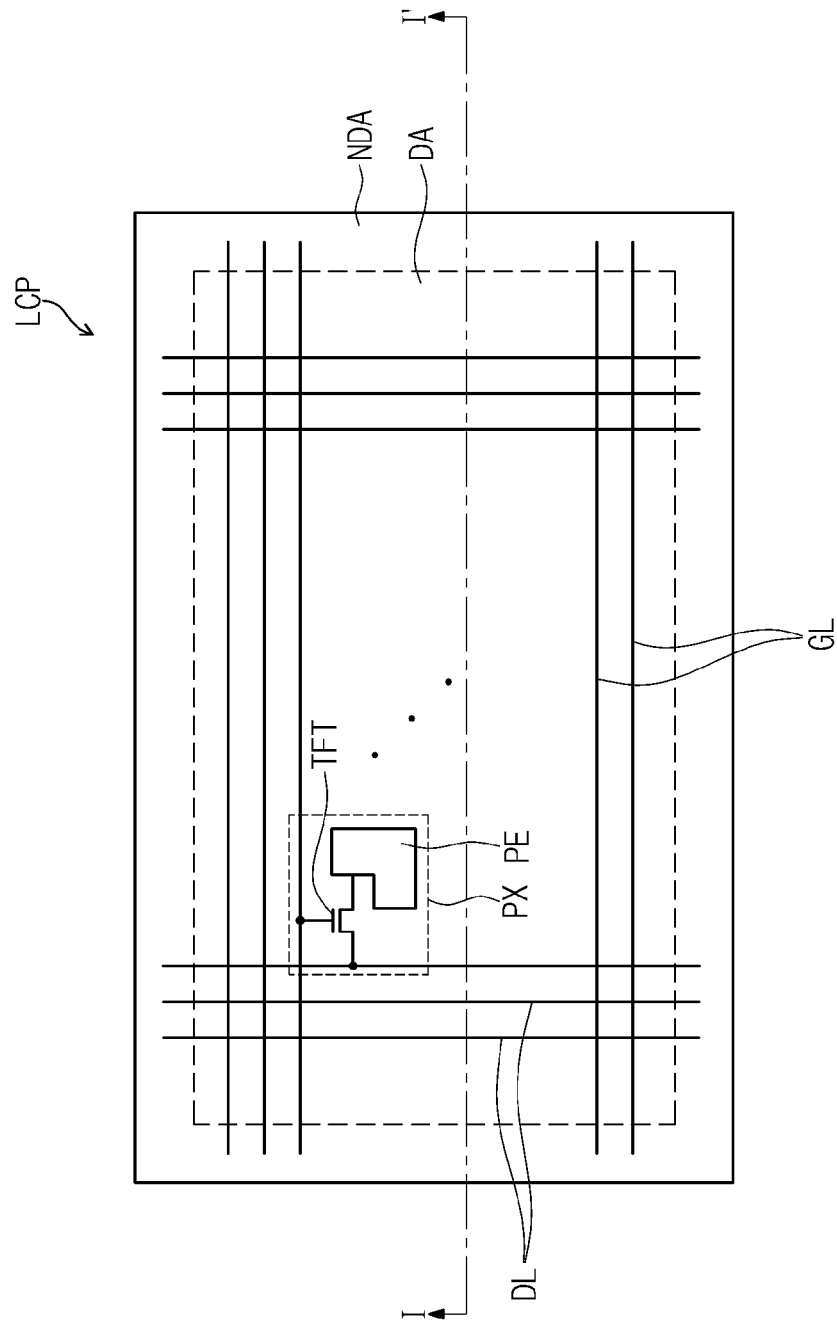
FIG. 2 is a plan view showing the liquid crystal display shown in FIG. 1.
Figure 3:
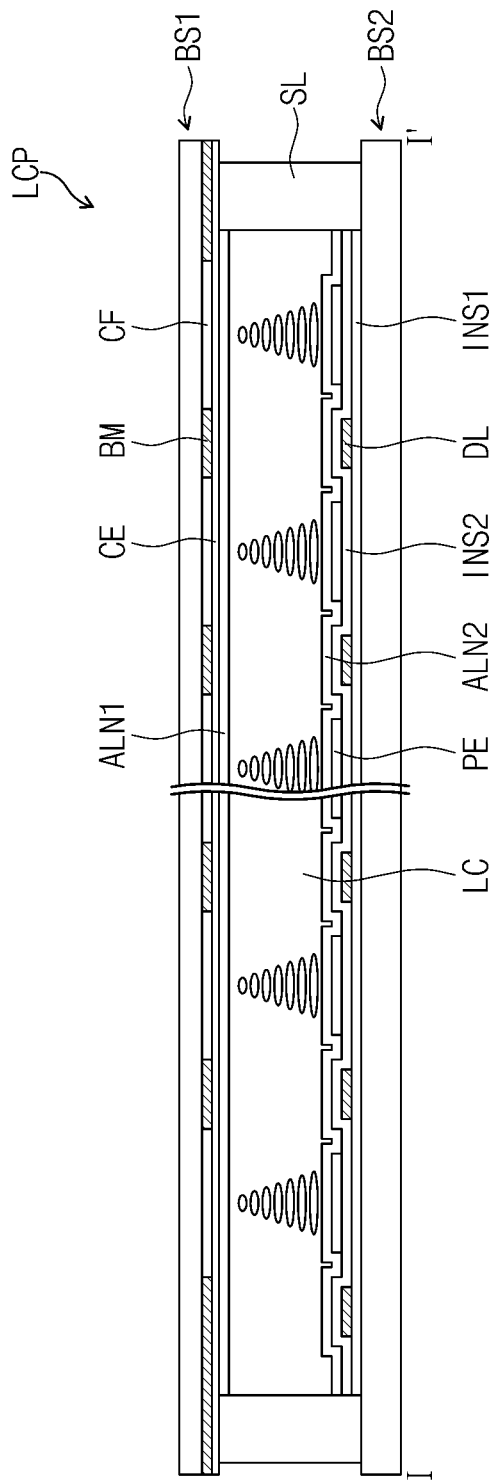
FIG. 3 is a cross-sectional view taken along line I-I' of FIG. 2.

FIG. 1 is a cross-sectional view showing an exemplary embodiment of a liquid crystal display according to the invention, FIG. 2 is a plan view showing the liquid crystal display shown in FIG. 1, and FIG. 3 is a cross-sectional view taken along line I-I' of FIG. 2.

Referring to FIGS. 1 to 3, the liquid crystal display includes a liquid crystal panel LCP and a polarizing plate disposed on a surface of the liquid crystal panel LCP.

The liquid crystal panel LCP includes a first substrate BS1, a second substrate BS2 facing the first substrate BS1, a sealant SL sealing the first and second substrates BS1 and BS2, and a liquid crystal LC disposed between the first and second substrates BS1 and BS2. In the exemplary embodiment, the liquid crystal LC includes a twisted nematic liquid crystal, but the invention is not limited thereto or thereby.

The first substrate BS1 includes a common electrode CE disposed on a surface thereof to face the second substrate BS2. The first substrate BS1 further includes a color filter CF and a black matrix BM.

The second substrate BS2 includes a display area DA in which a plurality of pixels PX is arranged to display an image, and a non-display area NDA corresponding to a side of the display area DA, in which the image is not displayed. The first substrate BS1 may include a display area and a non-display area which correspond to those of the second substrate BS2.

The second substrate BS2 includes a line part and the pixels PX. The line part includes one or more of a gate line GL disposed on the second substrate BS2, one or more of a data line DL crossing the gate line GL and one or more of a pixel electrode PE. The pixels PX include one or more thin film transistor TFT connected to the gate line GL and the data line DL, and the pixel electrode PE. Each of a plurality of thin film transistors TFT is connected to a corresponding gate line GL of a plurality of gate lines GL and a corresponding data line DL of a plurality of data lines DL to apply a voltage to a corresponding pixel electrode PE of a plurality of pixel electrodes PE.

Each thin film transistor TFT includes a gate electrode, an active layer, a source electrode and a drain electrode. The gate electrode is branched from the corresponding gate line GL of the gate lines GL. A first insulating layer INS1 is disposed on the second substrate BS2 to cover the gate electrode. The active layer is disposed on the first insulating layer INS1 and the source and drain electrodes are disposed on the active layer. The source and drain electrodes are spaced apart from each other to expose a portion of the active layer. In addition, the data lines DL are disposed on the first insulating layer INS1. The source electrode is branched from the corresponding data line of the data lines DL.

A second insulating layer INS2 is disposed on the first insulating layer INS1 to cover the source electrode, the drain electrode and the exposed active layer. The pixel electrodes PE are disposed on the second insulating layer INS2 to respectively correspond to the pixels PX, and each pixel electrode PE is electrically connected to the drain electrode through a contact hole defined in the second insulating layer INS2.

The black matrix BM of the first substrate BS1 includes one or more opening defined therein, each corresponding to and having the same shape as the corresponding pixel electrode PE. The color filter CF is provided in a plural number, and the color filters CF are respectively disposed in the openings defined in the black matrix BM. Each color filter CF may display a color, such as a red color, a green color and a blue color, but the invention is not limited thereto or thereby.

The liquid crystal LC is disposed between the first substrate BS1 and the second substrate BS2. The liquid crystal LC includes the twisted nematic liquid crystal. The twisted nematic liquid crystal has a dielectric anisotropy $\Delta\in$ in a range from about 7 to about 13. In addition, the twisted nematic liquid crystal has a retardation value $\Delta$nd in a range from about 400 nanometers (nm) to about 480 nm, where 'd' represents a cell gap. The dielectric anisotropy $\Delta\in$ and the retardation value $\Delta$nd of the twisted nematic liquid crystal may be changed according to characteristics of a polarizing film and a compensation film described later.

The sealant SL is disposed between the first substrate BS1 and the second substrate BS2 to correspond to the non-display area NDA. The sealant SL is disposed along an end portion of the first substrate BS1 and/or the second substrate BS2 to seal the liquid crystal LC.

A first alignment layer ALN1 and a second alignment layer ALN2 are disposed between the liquid crystal LC and the first substrate BS1 and between the liquid crystal LC and the second substrate BS2, respectively, to align the liquid crystal LC.

In the illustrated exemplary embodiment, the polarizing plate is disposed on both of opposing outer surfaces of the liquid crystal panel LCP, but the invention is not limited thereto or thereby. That is, the polarizing plate may be disposed on only one outer surface of the liquid crystal panel LCP. When the polarizing plate is disposed on both of the opposing outer surfaces of the liquid crystal panel LCP, the plurality of polarizing plates includes a first polarizing plate PLZ1 disposed on a first surface of the liquid crystal panel LCP, e.g., an upper surface, and a second polarizing plate PLZ2 disposed on a second surface of the liquid crystal panel LCP opposing the first surface, e.g., a lower surface. When the polarizing plate is disposed on only one surface of the liquid crystal panel LCP, another element that substantially serves the same function as the polarizing plate may be disposed on the opposing other surface of the liquid crystal panel LCP. In the illustrated exemplary embodiment, the plurality of polarizing plates including the first and second polarizing plates PLZ1 and PLZ2 will be described as a representative example.

The first polarizing plate PLZ1 includes a first compensation film CPN1 disposed on the upper surface of the liquid crystal panel LCP, a first polarizing film POL1 disposed on the first compensation film CPN1, and a first protective film PRT1 disposed on the first polarizing film POL1. Alternatively, the first polarizing plate PLZ1 may be considered as including the first protective film PRT1 disposed on the first polarizing film POL1, where the first compensation film CPN1 is between the first polarizing plate PLZ1 and the liquid crystal panel LCP.

The second polarizing plate PLZ2 includes a second compensation film CPN2 disposed on the lower surface of the liquid crystal panel LCP, a second polarizing film POL2 disposed on the second compensation film CPN2, and a second protective film PRT2 disposed on the second polarizing film POL2. Alternatively, the second polarizing plate PLZ2 may be considered as including the second protective film PRT2 disposed on the second polarizing film POL2, where the second compensation film CPN2 is between the second polarizing plate PLZ2 and the liquid crystal panel LCP. The first and second polarizing plate PLZ1 and PLZ2 will be described later.

Figure 4:
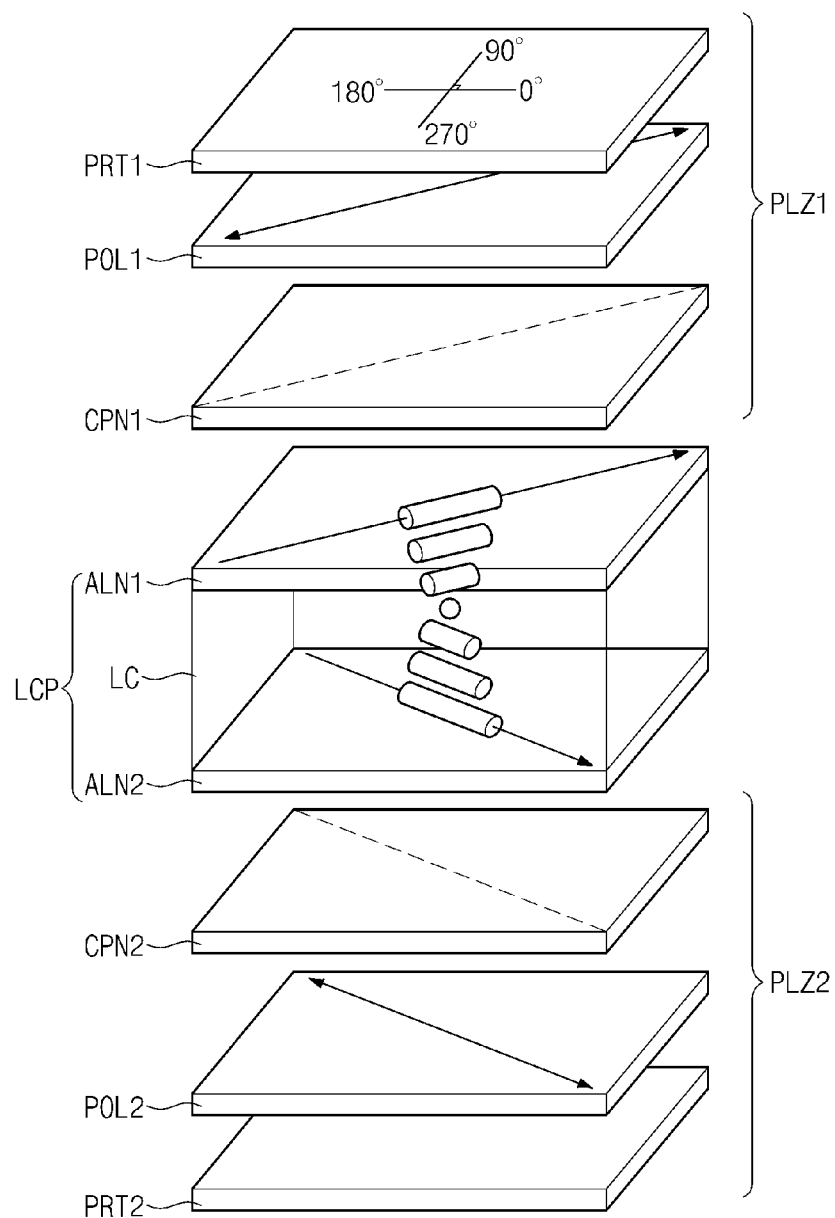
FIG. 4 is an exploded perspective view showing an exemplary embodiment of a liquid crystal display according to the invention.
Figure 5:
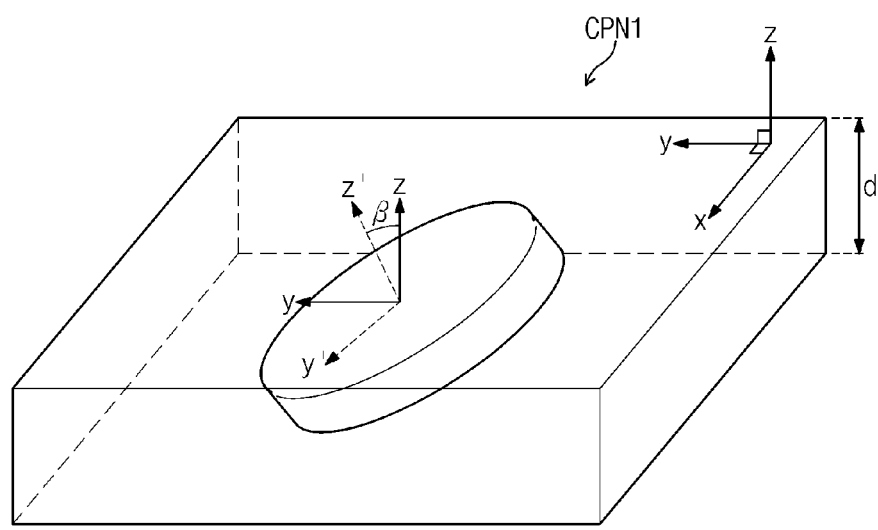
FIG. 5 is a perspective view showing an exemplary embodiment of a first compensation film shown in FIG. 4.

FIG. 4 is an exploded perspective view showing an exemplary embodiment of a liquid crystal display according to the invention and FIG. 5 is a perspective view showing the first compensation film shown in FIG. 4. FIG. 4 shows a relation between elements of the liquid crystal display, and thus for the convenience of explanation, the first and second substrates of the liquid crystal display have been omitted.

Referring to FIGS. 4 and 5, the first polarizing plate PLZ1 and the second polarizing plate PLZ2 face each other while interposing the liquid crystal panel LCP therebetween. The first polarizing plate PLZ1 includes the first compensation film CPN1, the first polarizing film POL1 and the first protective film PRT1 sequentially stacked one on another.

The liquid crystal panel LCP has a rectangular shape in a plan view with a pair of long sides and a pair of short sides. Hereinafter, angles are represented with reference to a direction in which the long sides are extended. For instance, a direction in which the short sides are extended is 90 degrees with respect to the direction in which the long sides are extended, and an opposite direction to the direction in which the short sides are extended is 270 degrees.

The first polarizing film POL1 absorbs light vibrating in a specific direction to polarize the light passing through the first polarizing film POL1 in a predetermined direction. In the illustrated exemplary embodiment, when assuming that the first polarizing film POL1 absorbs the light vibrating in a first direction and the first direction is a first polarizing axis, the first polarizing axis is in a direction of about 45°±10° (referring to the arrow on the first polarizing plate POL1).

The first polarizing film POL1 includes a polymer resin which is extended or stretched in a specific direction, such as to have an extension direction. The polymer resin may include, but is not limited to, a polyvinyl alcohol resin. In an exemplary embodiment of forming the first polarizing film POL1, the polyvinyl alcohol resin is obtained by saponifying a polyvinyl acetate resin, e.g., a homopolymer of vinyl acetate or a copolymer obtained by copolymerizing vinyl acetate with a monomer(s) that is copolymerizable with vinyl acetate. In an exemplary embodiment, the monomer may include an unsaturated carboxylic acid, an olefin, a vinyl ether, an unsaturated sulfonic acid, or a combination thereof; which is copolymerizable with vinyl acetate.

The first protective film PRT1 is disposed on the first polarizing film POL1 to protect the first polarizing film POL1 from an external impact which may cause a defect thereto, such as a scratch.

The first compensation film CPN1 compensates for the viewing angle of the light passing through the first polarizing plate PLZ1. The first compensation film CPN1 may be a uniaxial oriented film or a biaxial oriented film. In one exemplary embodiment, for instance, the first compensation film CPN1 is the uniaxial oriented film and is used as a negative C-plate.

In the illustrated exemplary embodiment, the first compensation film CPN1, which is biaxially oriented, will be described. Hereinafter, a surface of the first compensation film CPN1 is referred to as an x-y plane, an upper direction in the thickness direction of the first compensation film CPN1 is referred to as a z-axis, and refractive indices of x, y and z directions are referred to as nx, ny and nz, respectively. In addition, in the optical axis of the light passing through the first compensation film CPN1, an upper direction is referred to as a z'-axis and a plane passing through the x-axis and vertical (e.g., perpendicular) to the z'-axis is referred to as an x-y' plane. Here, refractive indices of y'-axis and z'-axis are referred to as ny' and nz', respectively.

When assuming that the plane passing through the x-axis and vertical to the optical axis of the first compensation film CPN1, e.g., the z'-axis, is referred to as the x-y' plane, the first retardation value $R_o'$ of the first compensation film CPN1 is $(n_x - n_y')$ multiplied by 'd' (e.g., $(n_x - n_y')d$), and the second retardation value $R_{th}'$ is $[(n_x + n_y')/2 - n_z']$ multiplied by 'd' (e.g., $[(n_x + n_y')/2 - n_z']d$), the first and second retardation values $R_o'$ and $R_{th}'$ satisfy the following Formula 1.

$$0.92 \leq R_{th}'/R_o' \leq 4.75 \qquad \text{Formula 1}$$

In Formula 1, 'd' denotes a thickness of the first compensation film CPN1 in the z-axis direction.

In the first compensation film CPN1, the refractive indices nx, ny' and nz' of the x-axis, the y'-axis, and the z'-axis are different from each other, e.g., $nx \neq ny' \neq nz'$.

The first retardation value $R_o'$ indicates a retardation value of the x-y' plane and the second retardation value $R_{th}'$ is a retardation value of the z'-axis of the first compensation film CPN1. The first retardation value $R_o'$ may be in a range from about 40 nm to about 100 nm and the second retardation value $R_{th}'$ may be in a range from about 110 nm to about 200 nm as long as such values satisfy the above Formula 1. When the first retardation value $R_o'$ is less than about 40 nm and the second retardation value $R_{th}'$ is less than about 110 nm, it is difficult to manufacture the first compensation film CPN1 and the first compensation film CPN1 may not function as a compensation film since the retardation value is too small. In addition, when the first retardation value $R_o'$ exceeds about 100 nm and the second retardation value $R_{th}'$ exceeds about 200 nm, it is difficult to match the first compensation film CPN1 with the liquid crystal panel LCP and the first polarizing film POL1, and the liquid crystal display LCP does not have desired transmittance and viewing angle since the retardation value is too large.

As describe above, the first compensation film CPN1 has the z'-axis as its optical axis, which is different from the z-axis, such as due to an extension method of the manufacturing process, and the optical axis is inclined with respect to the z-axis. The angle β between the optical axis of the first compensation film CPN1 and the z-axis is in a range from about 10 degrees (°) to about 25°. Where the angle β is in the range from about 10° to about 25°, the optical axis of the first compensation film CPN1 is inclined at the angle β with respect to a line substantially parallel to the first polarizing axis of the first polarizing film POL1. That is, the x-y' plane of the first compensation film CPN1 is inclined at the angle β with respect to the line substantially parallel to the first polarizing axis of the first polarizing film POL1.

The first compensation film CPN1 includes one or more thermoplastic resin, e.g., a polysulfone-containing resin, a polymethyl methacrylate-containing resin, a polystyrene-containing resin, a polycarbonate-containing resin, a polyvinyl chloride-containing resin, or a norbornene-containing resin. The thermoplastic resin may include a homopolymer, a copolymer, a block copolymer, an alternating block copolymer, a random polymer, a random copolymer, a random block copolymer, or the like, or a combination thereof.

In an exemplary embodiment of manufacturing the first polarizing plate PLZ1, the first compensation film CPN1 is manufactured by using a melting-extrusion process. That is, the first compensation film CPN1 is formed by allowing the thermoplastic resin to be in a state approaching a glass transition temperature of the thermoplastic resin, passing the thermoplastic resin through between first rollers rotated at different speeds to firstly extend the thermoplastic resin, and passing the thermoplastic resin through between second rollers arranged in a different direction from that of the first rollers to secondly extend the thermoplastic resin. The thermoplastic resin has isotropic property in the state approaching the glass transition temperature, but has anisotropic property through the first extension process.

In addition, the slope of the optical axis of the thermoplastic resin is adjusted through the second extension process. Here, the first extension process is performed in a direction substantially parallel to the first polarizing axis of the first polarizing film POL1 and the second extension process is performed in a direction crossing the first polarizing axis of the first polarizing film POL1. The directions of the first and second extension processes may be changed according to a kind of the polymer resin, strength of the extension and/or the angle β between the optical axis of the first compensation film CPN1 and the z-axis. In the illustrated exemplary embodiment, the first extension process is performed in the direction of about 45°±10° and the second extension process is performed in the direction of about 135°±10°.

The first alignment layer ALN1 is disposed between the first substrate BS1 and the liquid crystal LC and rubbed in a direction substantially parallel to the first polarizing axis of the first polarizing film POL1. In the illustrated exemplary embodiment, the first alignment layer ALN1 is rubbed in the direction of about 45°±10°.

The second polarizing film POL2, the second compensation film CPN2 and the second protective film PRT2 are arranged in the same way as the first polarizing film POL1, the first compensation film CPN1 and the first protective film PRT1. In the second polarizing plate PLZX2, different portions from those of the first polarizing plate PLZ1 will be mainly described in order to avoid redundancy.

The second polarizing film POL2 has a second polarizing axis crossing the first polarizing axis of the first polarizing film POL1. In the illustrated exemplary embodiment, the second polarizing axis is formed in a direction of about 135°±10°.

The second compensation film CPN2 compensates for the viewing angle of the light passing through the second polarizing plate PLZ2.

In the second compensation film CPN2, a surface of the second compensation film CPN2 is referred to as an x-y plane, a lower direction in the thickness direction of the second compensation film CPN2 is referred to as a z-axis, and refractive indices of x, y and z directions are referred to as nx, ny and nz, respectively. In addition, in the optical axis of the light passing through the second compensation film CPN2, a lower direction is referred to as a z'-axis and a plane passing through the x-axis and vertical to the z'-axis is referred to as an x-y' plane. Here, refractive indices of y'-axis and z'-axis are referred to as ny' and nz', respectively.

When assuming that the plane passing through the x-axis and vertical to the optical axis of the second compensation film CPN2, e.g., the z'-axis, is referred to as the x-y' plane, the first retardation value $R_o'$ of the second compensation film CPN2 is $(n_x-n_y')d$, and the second retardation value $R_{th}'$ is $[(n_x+n_y')/2-n_z']d$, the first and second retardation values $R_o'$ and $R_{th}'$ satisfy the Formula 1.

$$0.92 \leq R_{th}'/R_o' \leq 4.75 \qquad \text{Formula 1}$$

As mentioned earlier, in Formula 1, 'd' denotes a thickness of the second compensation film CPN2 in the z-axis direction.

In the second compensation film CPN2, the refractive indices nx, ny' and nz' of the x-axis, the y'-axis and the z'-axis are different from each other, e.g., nx≠ny'≠nz'.

The first retardation value $R_o'$ indicates a retardation value of the x-y' plane and the second retardation value $R_{th}'$ is a retardation value of the z'-axis of the second compensation film CPN2. The first retardation value $R_o'$ may be in a range from about 40 nm to about 100 nm and the second retardation value $R_{th}'$ may be in a range from about 110 nm to about 200 nm as long as such values satisfy the above Formula 1. When the first retardation value $R_o'$ is less than about 40 nm and the second retardation value $R_{th}'$ is less than about 110 nm, it is difficult to manufacture the second compensation film CPN2 and the second compensation film CPN2 may not function as a compensation film since the retardation value is too small. In addition, when the first retardation value $R_o'$ exceeds about 100 nm and the second retardation value $R_{th}'$ exceeds about 200 nm, it is difficult to match the second compensation film CPN2 with the liquid crystal panel LCP and the second polarizing film POL2, and the liquid crystal display LCP does not have desired transmittance and viewing angle since the retardation value is too large.

As describe above, the second compensation film CPN2 has the z'-axis as its optical axis, which is different from the z-axis, such as due to an extension method of the manufacturing process, and the optical axis is inclined with respect to the z-axis. The angle β between the optical axis of the second compensation film CPN2 and the z-axis is in a range from about 10° to about 25°. Where the angle β is in the range from about 10° to about 25°, the optical axis of the second compensation film CPN2 is inclined at the angle β with respect to a line substantially parallel to the second polarizing axis of the second polarizing film POL2. That is, the x-y' plane of the second compensation film CPN2 is inclined at the angle β with respect to the line substantially parallel to the second polarizing axis of the second polarizing film POL2.

In an exemplary embodiment of manufacturing the second polarizing plate PLZ2, the second compensation film CPN2 is manufactured by using a melting-extrusion process. That is, the second compensation film CPN2 is formed by allowing the thermoplastic resin to be in a state approaching a glass transition temperature of the thermoplastic resin, passing the thermoplastic resin through between first rollers rotated at different speeds to firstly extend the thermoplastic resin, and passing the thermoplastic resin through between second rollers arranged in a different direction from that of the first rollers to secondly extend the thermoplastic resin. Here, the first extension process is performed in a direction substantially parallel to the second polarizing axis of the second polarizing film POL2 and the second extension process is performed in a direction crossing the second polarizing axis of the second polarizing film POL2. The directions of the first and second extension processes may be changed according to a kind of the polymer resin, strength of the extension, and the angle β between the optical axis of the second compensation film CPN2 and the z-axis. In the illustrated exemplary embodiment, the first extension process is performed in the direction of about 135°±10° and the second extension process is performed in the direction of about 225°±10°.

The second alignment layer ALN2 is disposed between the second substrate BS2 and the liquid crystal LC and rubbed in a direction substantially parallel to the second polarizing axis of the second polarizing film POL2. In the illustrated exemplary embodiment, the second alignment layer ALN2 is rubbed in the direction of about 135°±10°.

As described above, the liquid crystal display includes the first and second compensation films CPN1 and CPN2, and thus the viewing angle and the contrast ratio thereof may be improved as compared to the viewing angle and the contrast ratio of a conventional liquid crystal display adopting a discotic liquid crystal ("DLC") compensation film.

Figure 6:
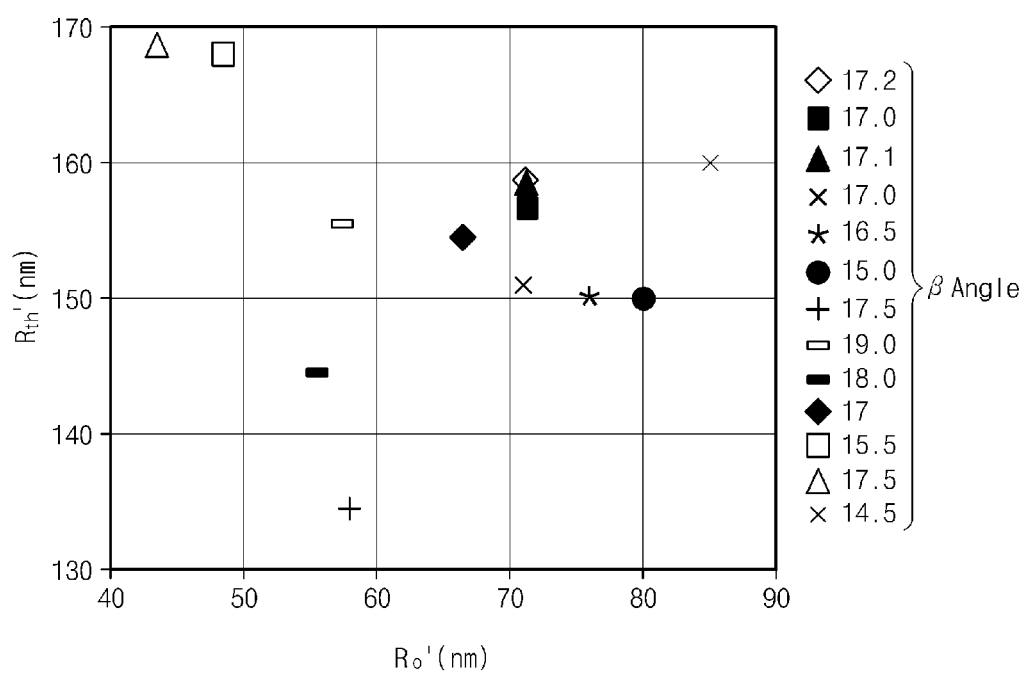
FIG. 6 is a graph showing a first retardation value in nanometers (nm) and a second retardation value in nanometers (nm) according to an angle in degrees between an optical axis of a compensation film and a z axis in an exemplary embodiment of a liquid crystal display according to the invention.

FIG. 6 is a graph showing the first retardation value $R_o'$ in nm and the second retardation value $R_{th}'$ in nm according to the angle β between the optical axis of the compensation film and the z axis in an exemplary embodiment of a liquid crystal display according to the invention.

Figure 7:
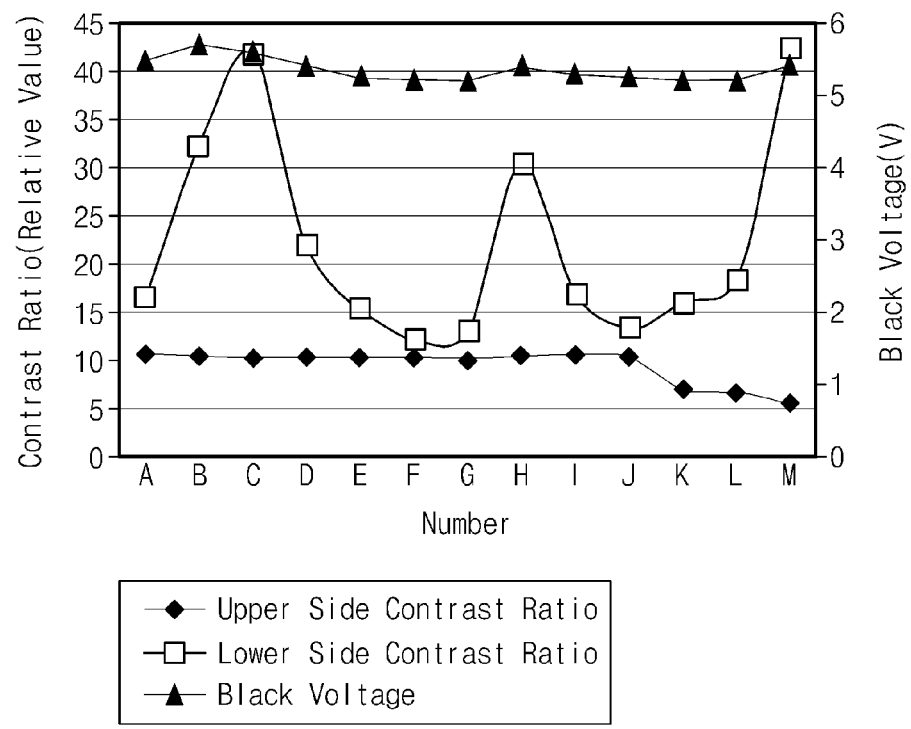
FIG. 7 is a graph showing relative values of a contrast ratio according to the angle between the optical axis of the compensation film shown in FIG. 6, and the z axis.

FIG. 7 is a graph showing relative values of a contrast ratio according to the angle β between the optical axis of the compensation film shown in FIG. 6, and the z axis. The compensation film is manufactured by the above-mentioned method, and each contrast ratio is measured when the viewing angle, e.g., a poloidal angle when the direction vertical to the display area of the liquid crystal display is set to 0°, of a viewer at an upper side direction and a lower side direction is about 80°. A black voltage indicates a pixel voltage when each pixel of the exemplary embodiment of the liquid crystal display according to the invention displays a black color.

In FIG. 7, values of the contrast ratio when the poloidal angle of the upper and lower side directions is 80° are as the following Table 1.

TABLE 1

| Number | Angle (β) | Upper side contrast ratio(relative value) | Lower side contrast ratio(relative value) | Black voltage (V) |
|---|---|---|---|---|
| A | 17.5 | 11 | 17 | 5.5 |
| B | 18.0 | 10 | 32 | 5.7 |
| C | 19.0 | 10 | 42 | 5.6 |
| D | 17.0 | 10 | 22 | 5.4 |
| E | 17.2 | 10 | 15 | 5.3 |
| F | 17.1 | 10 | 12 | 5.2 |
| G | 17.0 | 10 | 13 | 5.2 |
| H | 17.0 | 10 | 30 | 5.4 |
| I | 16.5 | 11 | 17 | 5.3 |
| J | 15.0 | 10 | 13 | 5.3 |
| K | 17.5 | 7 | 16 | 5.2 |
| L | 15.5 | 6.7 | 18 | 5.2 |
| M | 14.5 | 5.4 | 42 | 5.4 |

As shown in FIGS. 6, 7 and Table 1, the contrast ratio of the first polarizing plate and the second polarizing plate is changed according to the angle β between the optical axis of the compensation films and the z-axis. However, although the angle β between the optical axis of the compensation films and the z-axis is constant, the contrast ratio of the first polarizing plate may be changed. This is because the refractive indices of the x-axis, the y'-axis, and the z'-axis are changed and the first and second retardation values are changed even though the angle β between the optical axis of the compensation films and the z-axis is constant.

Referring to FIGS. 6, 7 and Table 1, in the embodiments of A to J, the upper side contrast ratio is represented at 10 or 11 in each angle β. However, in the embodiments of K, L and M, the upper side contrast ratio is represented at 7, 6.7 and 5.4. This means that the contrast ratio becomes small when the viewing angle is 80°, and thus the viewing angle of the liquid crystal display becomes narrow. On the contrary, the lower side contrast ratio has various values in the range from 12 to 42 in the embodiments of A to M. Since the lower side contrast ratio is more than 10 in the embodiments of A to M, the image displayed on the liquid crystal display may be better perceived by the viewer even though the viewing angle is 80°. The black voltage is substantially uniform in the embodiments of A to M.

Consequently, the contrast ratio is appropriate in the embodiments of A to J, but the contrast ratio is very small in the embodiments of K, L and M. When this is represented by a relational formula of the first and second retardation values, the contrast ratio satisfies the following formula of 0.92≤second retardation value($R_{th}$')/first retardation value($R_o$')≤4.75.

As described above, the liquid crystal display may have a high contrast ratio even though the viewing angle is 80°. In addition, the liquid crystal display may have the improved viewing angle and the improved contrast ratio as compared to those of the conventional liquid crystal display adopting the DLC compensation film.

Figure 8A:
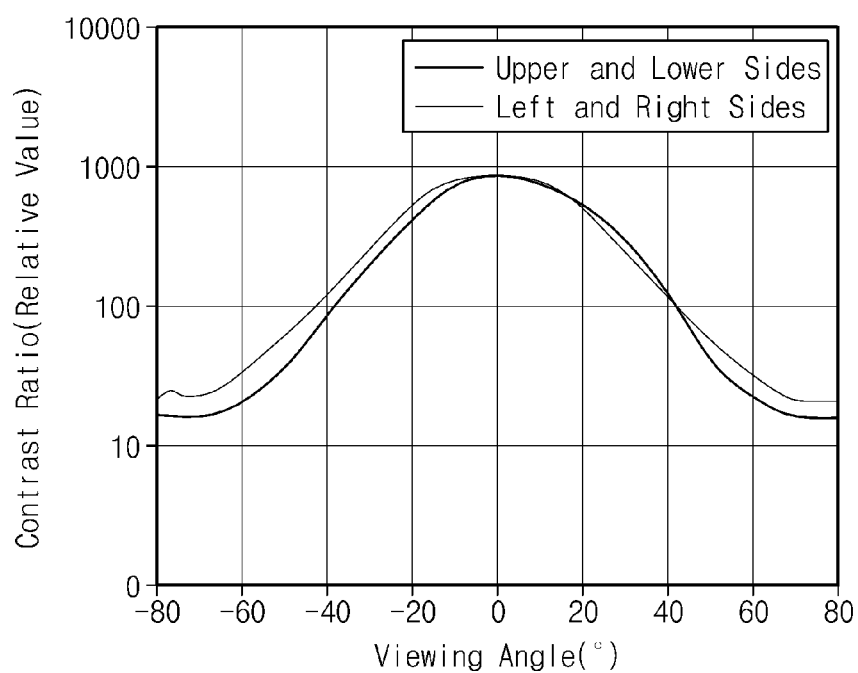
FIG. 8A is a graph showing relative values of a contrast ratio according to a viewing angle in a conventional liquid crystal display adopting a discotic liquid crystal ("DLC") compensation film.
Figure 8B:
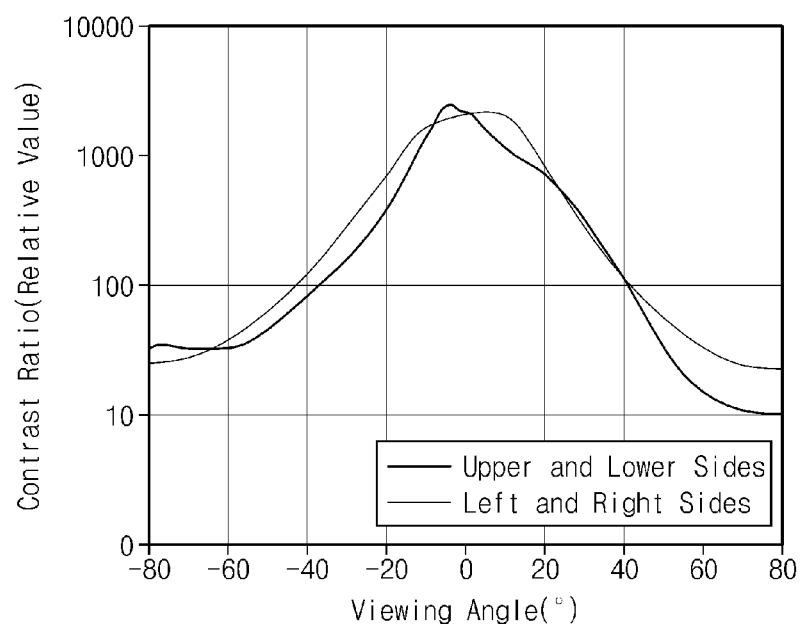
FIG. 8B is a graph showing relative values of a contrast ratio according to a viewing angle in an exemplary embodiment of a liquid crystal display adopting the compensation film according to the invention.

FIG. 8A is a graph showing relative values of a contrast ratio according to a viewing angle in a conventional liquid crystal display adopting the DLC compensation film, and FIG. 8B is a graph showing relative values of a contrast ratio according to a viewing angle in an exemplary embodiment of the liquid crystal display adopting the compensation film according to the invention. Here, upper and lower directions correspond to the direction in which one of the long and short sides of the liquid crystal panel is elongated, and left and right directions correspond to the direction in which the other one of the long and short sides of the liquid crystal panel is extended. In addition, the conventional liquid crystal display and exemplary embodiment of the liquid crystal display according to the invention have the same configurations except for the first and second polarizing plates. The conventional liquid crystal display employs the DLC compensation film in the first and second polarizing plates, and the exemplary embodiment of the liquid crystal display according to the invention employs the compensation film instead of the DLC compensation film.

Referring to FIGS. 8A and 8B, when the viewer watches the display area of the liquid crystal displays from the front direction, e.g., the viewing angle is about zero, the contrast ratio of the exemplary embodiment of the liquid crystal display according to the invention is greater than the contrast ratio of the conventional liquid crystal display. In addition, when the viewer watches the display area of the liquid crystal displays from the side direction of them, e.g., the viewing angle is about +80° or −80°, the contrast ratio of the exemplary embodiment of the liquid crystal display according to the invention is substantially the same as that of the conventional liquid crystal display, e.g., more than about 10.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A liquid crystal display comprising:
   a liquid crystal panel;
   a polarizing plate on a surface of the liquid crystal panel and having a polarizing axis; and
   a compensation film between the liquid crystal panel and the polarizing plate, and having an optical axis at which light passes through the compensation film,
   wherein,
   when a surface of the compensation film is referred to as a x-y plane, a plane passing through an x-axis and vertical to the optical axis of the compensation film is referred to as an x-y' plane,
   a first retardation value ($R_o$') of the compensation film is ($n_x-n_y$')d, and a second retardation value ($R_{th}$') is [($n_x$+$n_y$')/2−$n_z$']d, and the first and second retardation values ($R_o$') and ($R_{th}$') satisfy the following Formula of 0.92≤$R_{th}$'/$R_o$'≤4.75, where 'n' denotes a refractive index and 'd' denotes a thickness of the compensation film taken along a z-axis.

2. The liquid crystal display of claim 1, wherein
   when the optical axis of the compensation film is a z'-axis which is vertical to the x-y' plane,
   the first retardation value is a retardation value with respect to the x-y' plane, and the second retardation value is a retardation value with respect to the z'-axis of the compensation film.

3. The liquid crystal display of claim 2, wherein
   the first retardation value is in a range from about 40 nanometers to about 100 nanometers, and
   the second retardation value is in a range from about 110 nanometers to about 200 nanometers.

4. The liquid crystal display of claim 1, wherein an angle between the optical axis and the z-axis of the compensation film is in a range from about 10° to about 25°.

5. The liquid crystal display of claim 4, wherein the polarizing plate comprises:
   a first polarizing film on a first surface of the liquid crystal panel and having a first polarizing axis; and
   a second polarizing film on a second surface of the liquid crystal panel opposing the first surface, and having a second polarizing axis, wherein the first polarizing axis and the second polarizing axis cross each other.

6. The liquid crystal display of claim 5, wherein the compensation film comprises a first compensation film between the liquid crystal panel and the first polarizing film and a second compensation film between the liquid crystal panel and the second polarizing film.

7. The liquid crystal display of claim 6, wherein
   the x-y' plane of the first compensation film is inclined at the angle with respect to a line substantially parallel to the first polarizing axis of the first polarizing film; and
   the x-y' plane of the second compensation film is inclined at the angle with respect to a line substantially parallel to the second polarizing axis of the second polarizing film.

8. The liquid crystal display of claim 1, wherein the liquid crystal panel comprises:
   a first substrate;
   a second substrate facing the first substrate; and
   a liquid crystal between the first substrate and the second substrate, wherein the liquid crystal is a twisted nematic liquid crystal.

9. The liquid crystal display of claim 8, wherein the twisted nematic liquid crystal has a dielectric anisotropy in a range from about 7 to about 13.

10. The liquid crystal display of claim 8, wherein the twisted nematic liquid crystal has a retardation value in a range from about 400 nanometers to about 480 nanometers.

11. The liquid crystal display of claim 8, further comprising:
- a first alignment layer between the first substrate and the liquid crystal, and aligned in a same direction as the first polarizing axis of the first polarizing film; and
- a second alignment layer between the second substrate and the liquid crystal, and aligned in a same direction as the second polarizing axis of the second polarizing film.

12. The liquid crystal display of claim 1, wherein the compensation film comprises a thermoplastic resin.

13. The liquid crystal display of claim 1, wherein the compensation film is a negative C-plate.

14. The liquid crystal display of claim 13, wherein refractive indices of the compensation film in x, y and z axes are different from each other ($nx \neq ny' \neq nz'$).

15. A polarizing plate comprising:
- a polarizing film having a polarizing axis; and
- a compensation film on a surface of the polarizing film and having an optical axis at which light passes through the compensation film,
wherein,
when a surface of the compensation film is referred to as a x-y plane, a plane passing through an x-axis and vertical to the optical axis of the compensation film is referred to as an x-y' plane,
a first retardation value ($R_o'$) of the compensation film is $(n_x - n_y')d$, and a second retardation value ($R_{th}'$) is $[(n_x + n_y')/2 - n_z']d$, and the first and second retardation values ($R_o'$) and ($R_{th}'$) satisfy the following Formula of $0.92 \leq R_{th}'/R_o' \leq 4.75$, where 'n' denotes a refractive index and 'd' denotes a thickness of the compensation film taken along a z-axis.

16. The polarizing plate of claim 15, wherein when the optical axis of the compensation film is a z'-axis which is vertical to the x-y' plane, the first retardation value is a retardation value with respect to the x-y' plane, and the second retardation value is a retardation value with respect to the z'-axis of the compensation film.

17. The polarizing plate of claim 16, wherein the first retardation value is in a range from about 40 nanometers to about 100 nanometers, and the second retardation value is in a range from about 110 nanometers to about 200 nanometers.

18. The polarizing plate of claim 15, wherein an angle between the optical axis and the z-axis of the compensation film is in a range from about 10° to about 25°.

19. The polarizing plate of claim 18, wherein the x-y' plane of the compensation film is inclined at the angle with respect to a line substantially parallel to the polarizing axis of the polarizing film.

* * * * *